350-276 SR

3/3/81 OR 4,253,737

United States Patent [19]

Thomsen et al.

[11] 4,253,737

[45] Mar. 3, 1981

[54] ANTI-GLARE DEVICE FOR A COMPUTER TERMINAL DISPLAY TUBE

[75] Inventors: Erik J. Thomsen, San Rafael; Patrick W. Brennan, Greenbrae, both of Calif.

[73] Assignee: Sun-Flex Company, San Rafael, Calif.

[21] Appl. No.: 11,112

[22] Filed: Feb. 12, 1979

[51] Int. Cl.³ .............................................. G02B 27/00

[52] U.S. Cl. .................................. 350/276 R; 358/252

[58] Field of Search .................... 350/276 R, 111, 144; 358/93, 148, 161, 187, 229, 242, 250, 252, 253, 255

[56] References Cited

U.S. PATENT DOCUMENTS

| | | | |
|---|---|---|---|
| 2,977,412 | 3/1961 | Rhodes et al. | 350/276 R |
| 3,215,054 | 11/1965 | Hamilton | 350/276 R |
| 3,390,447 | 7/1968 | Mears | 350/276 R |
| 3,511,560 | 5/1970 | Hamilton | 350/276 R |

FOREIGN PATENT DOCUMENTS

| | | | |
|---|---|---|---|
| 521316 | 4/1956 | Canada | 350/276 R |
| 1383756 | 11/1964 | France | 350/276 R |

*Primary Examiner*—John K. Corbin
*Assistant Examiner*—B. W. de los Reyes
*Attorney, Agent, or Firm*—Melvin R. Stidham

[57] ABSTRACT

An anti-glare device for the display tube of a computer terminal or other video display tube wherein illuminated messages or images are presented on a highly reflective surface, comprising a microweave screen of fine black filaments in a fine mesh mounted in a flexible frame so that the screen conforms to and maintains contact with, the display tube. The frame is secured so that the screen covers the terminal tube, and substantially conforms to the surface thereof. The filaments are preferably approximately 0.0025 inch in diameter and there are approximately 150 filaments per inch.

3 Claims, 3 Drawing Figures

ANTI-GLARE DEVICE FOR A COMPUTER TERMINAL DISPLAY TUBE

BACKGROUND OF THE INVENTION

There is an ever expanding use of computer terminals and other video display screens or tubes wherein a message or image is displayed in illuminated numbers and words. Typically, a keyboard operator punches out the date input, and the message so input, as well as the output retrieved from the computer are flashed on a screen which is normally of glass or other highly reflective material. Experience has shown that there are many instances of eye fatigue and worker inefficiency resulting from reading the messages displayed on highly reflective surfaces for extended periods. Various filters and screens have been tried in order to eliminate the glare but such screens carried in a rigid frame spaced from the display tube produce distorations in Newton rings and Moires.

OBJECT OF THE INVENTION

It is an object of this invention to provide a device for eliminating the glare from the surface of a computer terminal display tube or other video viewer without interferring with the reception of the illuminated display.

It is a further object of this invention to facilitate extended human viewing of a computer terminal display.

Other objects and advantages of this invention will become apparent from the description to follow, particularly when read in conjunction with the accompanying drawings.

SUMMARY OF THE INVENTION

In carrying out this invention, I provide a screen of microweave mesh of black filaments of Nylon or the like, and mount the screen in a flexible frame adapted to be mounted directly on the front of a terminal display tube to conform substantially to the surface thereof. The filaments are approximately 0.0025 inch in diameter and there are approximately 150 filaments per inch, providing mesh openings approximately 0.005 inch. Means are provided on the frame for attaching the screen to cover the surface of the terminal tube so that even light which passes through the mesh openings is absorbed by the black filaments when reflected back from the surface of the tube. The screen maintains contact over the surface of the tube to eliminate Newton rings and Moirés.

DESCRIPTION OF A PREFERRED EMBODIMENT

Figure 1:
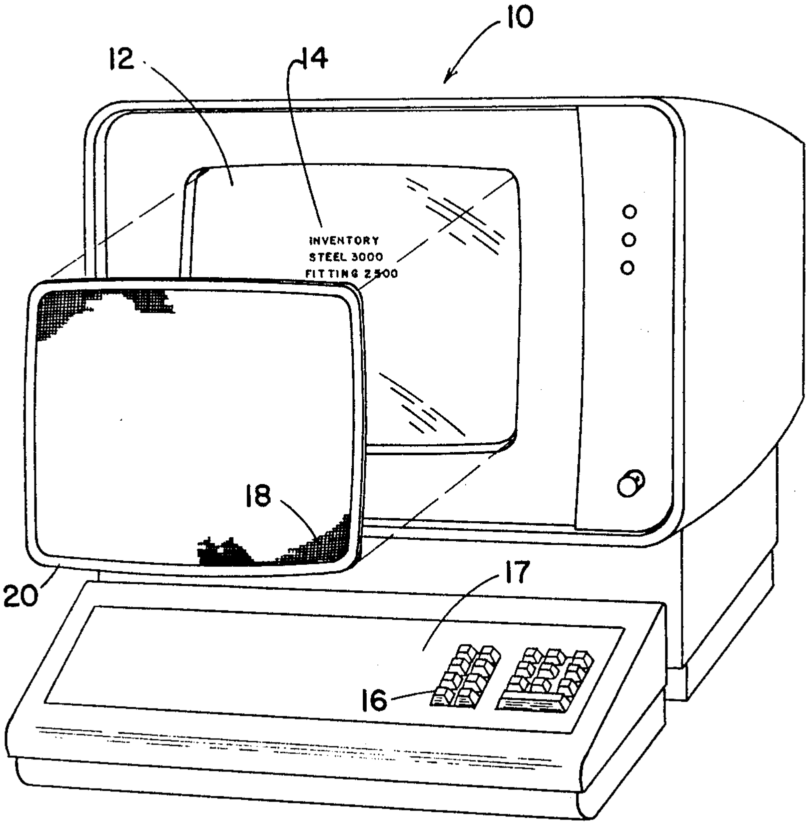
FIG. 1 is a perspective view of the keyboard display terminal showing my anti-glare device.

Referring now to FIG. 1 with greater particularity, there is shown a computer terminal 10 having a tube 12 on which a message 14 is presented in illuminated numbers, symbols and letters representing an input and/or feedback in accordance with operation of standard keys

16 at a keyboard 17, In typical operation, an operator is positioned in front of the highly reflective display screen or tube 12 having a surface of glass or the like and punches in input signals at the keyboard 16 which are read on a screen 12 and then translated by the computer 10 to a message 14 to be read by the operator. Because of the highly reflective surface of the scope 12, sunlight, room lighting and the like presents a glare from the tube surface which lessons the contrast between symbols and background 12. This often results in eyestrain, impairing the efficiency of the operator and making it difficult to work at the keyboard 16 for extended periods.

In carrying out this invention, I provide a screen of a micro woven material such as Nylon which has been dyed black to render it more light absorbent. The screening 18 is of very fine filaments woven in close mesh and mounted in an opaque frame 20 of a relatively rigid material such as a suitable plastic. The filaments in the screen 18 are substantially less than 0.01 inch diameter and preferably around 0.0025 inch in diameter, with more than 75 and preferably approximately 150 filaments per inch.

The frame 18 is adhered around the face of the tube 12 and, being of a flexible material, such as a suitable plastic, conforms to and contacts, the curved surface of the tube so that the distortion caused by the mingling of shadows cast by the filaments of the microweave screen 18 which otherwise may produce Newton rings and Moire patterns, is eliminated. The screen 18 may be secured to cover the tube 12 by clamping it thereto under the front panel or bezel, or it may be secured to the tube by means of a strip 24 of an adhesive material carried on the flexible frame, with the screen 18 maintaining contact with the tube 12, as shown in FIG. 2.

Figure 2:
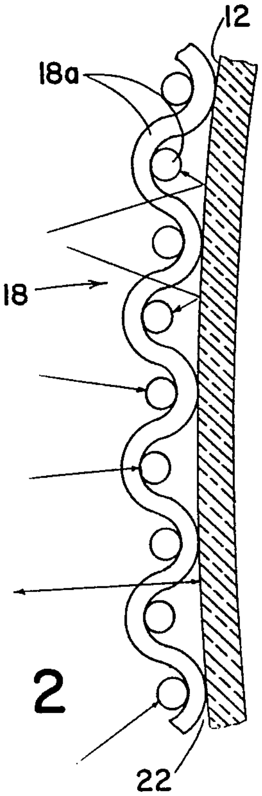
FIG. 2 is a partial section view taken through the screen and the surface of the display tube.
Figure 3:
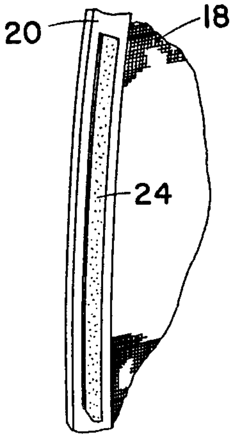
FIG. 3 is a partial view in perspective of the anti-glare screen and frame.

As indicated by the arrows in FIG. 2, virtually the only external light which is reflected back to the operator's eye is that which is normal or nearly normal to the tube 12. Any light rays approaching from an angle are absorbed directly, or upon reflection by the black Nylon filaments **18*a* of the screen 18**.

With 150 filaments per inch, each 0.0025 inches in diameter, 37½ of each lineal inch across the screen is occupied by filaments, themselves very closely spaces in fine mesh to present a very effective barrier against transmission of direct and reflected light. This greatly reduces glare to virtually nil, correspondingly increasing operator comfort and efficiency.

A screen material 18 satisfactory for purposes of this invention is a monofilament Nylon screen particularly adapted for fluid screening and filtering.

While this invention has been described in conjunction with a preferred embodiment thereof, it is obvious that modifications and changes therein may be made by those skilled in the art without departing from the spirit and scope of this invention, as defined by the claims appended hereto.

Having described our invention, we claim:

1. An anti-glare device for a curved video display screen comprising:
   - a thin, lightweight, portable frame of a flexible material;
   - a microweave mesh of black filaments stretched across the inner surface of said frame;
   - said frame being wide enough that it resists bending in all directions in the plane of the mesh but being flexible in all directions transverse thereto so that said frame and stretched mesh will conform to the curvature of a terminal display scope to which said frame is attached; and means for attaching said frame to a terminal display scope so that said mesh conforms to and contacts said scope over the surface thereof.

2. The anti-glare device defined by claim 1 including: means on said frame for securing said flexible frame directly to the surface of a display scope.

3. The anti-glare device defined by claim 1 wherein: said frame is of a size and shape to be clamped to said screen by the video terminal front panel.

* * * * *

REEXAMINATION CERTIFICATE (1187th)

United States Patent [19]

[11] B1 4,253,737

Thomsen et al.

[45] Certificate Issued Jan. 16, 1990

[54] ANTI-GLARE DEVICE FOR A COMPUTER TERMINAL DISPLAY

[75] Inventors: Erik J. Thomsen, San Rafael; Patrick W. Brennan, Greenbrae, both of Calif.

[73] Assignee: Sun-Flex Co., San Rafael, Calif.

Reexamination Request:
No. 90/001,648, Nov. 29, 1988

Reexamination Certificate for:

| | |
|---|---|
| Patent No.: | 4,253,737 |
| Issued: | Mar. 3, 1981 |
| Appl. No.: | 11,112 |
| Filed: | Feb. 12, 1979 |

[51] Int. Cl.[4] .......... G02B 27/00
[52] U.S. Cl. .......... 350/276 R; 358/252
[58] Field of Search .......... 350/276 R, 322; 358/245, 247, 248, 252, 253

[56] References Cited

U.S. PATENT DOCUMENTS

| | | | |
|---|---|---|---|
| 2,091,152 | 8/1937 | Malpica . | |
| 2,182,585 | 12/1939 | Green . | |
| 2,313,904 | 3/1943 | Van Brederode | 350/321 |
| 2,673,342 | 3/1954 | Sims, Jr. et al. . | |
| 2,942,254 | 6/1960 | Beers . | |
| 2,977,412 | 3/1961 | Rhodes et al. | 358/252 |
| 3,084,217 | 4/1963 | Fiore et al. | 358/247 |
| 3,146,305 | 4/1964 | Monaco et al. | 358/247 |
| 3,164,672 | 1/1965 | Spear et al. | 358/247 |
| 3,194,885 | 7/1965 | Hamilton . | |
| 3,209,191 | 9/1965 | Hamilton . | |
| 3,215,776 | 11/1965 | Hamilton . | |
| 3,215,777 | 11/1965 | Hamilton . | |
| 3,277,455 | 10/1966 | Viret et al. . | |
| 3,297,823 | 1/1967 | Neubauer | 358/245 |
| 3,305,623 | 2/1967 | Bakker et al. . | |
| 3,341,391 | 9/1967 | Hamilton . | |
| 3,361,548 | 1/1968 | Hamilton . | |
| 3,362,804 | 1/1968 | Hamilton . | |
| 3,378,421 | 4/1968 | Hamilton . | |
| 3,378,636 | 4/1968 | Hamilton . | |
| 3,582,189 | 6/1971 | Moritz et al. | 350/276 R |
| 3,909,524 | 9/1975 | Ohkoshi et al. . | |
| 3,952,152 | 4/1976 | Lill et al. . | |
| 4,031,553 | 6/1977 | Sumiyoshi et al. . | |
| 4,246,613 | 1/1981 | Choder et al. | 358/245 |
| 4,247,871 | 1/1981 | Hirsch et al. | 358/248 |

FOREIGN PATENT DOCUMENTS

| | | |
|---|---|---|
| 2712321 | 9/1978 | Fed. Rep. of Germany . |
| 36-25434 | 9/1961 | Japan . |
| 53-1131729 | 11/1978 | Japan . |
| 539428 | 9/1941 | United Kingdom . |
| 675925 | 7/1952 | United Kingdom . |
| 706190 | 3/1954 | United Kingdom . |
| 1354409 | 5/1974 | United Kingdom . |

OTHER PUBLICATIONS

Beers, "Minimizing the Effects of Ambient Light on Image Reproduction", J. of the SMPTE, vol. 66, Jun. 1957, pp. 347-354.

*Primary Examiner*—Bruce Y. Arnold
*Attorney, Agent, or Firm*—Townsend and Townsend

[57] ABSTRACT

An anti-glare device for the display tube of a computer terminal or other video display tube wherein illuminated messages or images are presented on a highly reflective surface, comprising a microweave screen of fine black filaments in a fine mesh mounted in a flexible frame so that the screen conforms to and maintains contact with, the display tube. The frame is secured so that the screen covers the terminal tube, and substantially conforms to the surface thereof. The filaments are preferably approximately 0.0025 inch in diameter and there are approximately 150 filaments per inch.

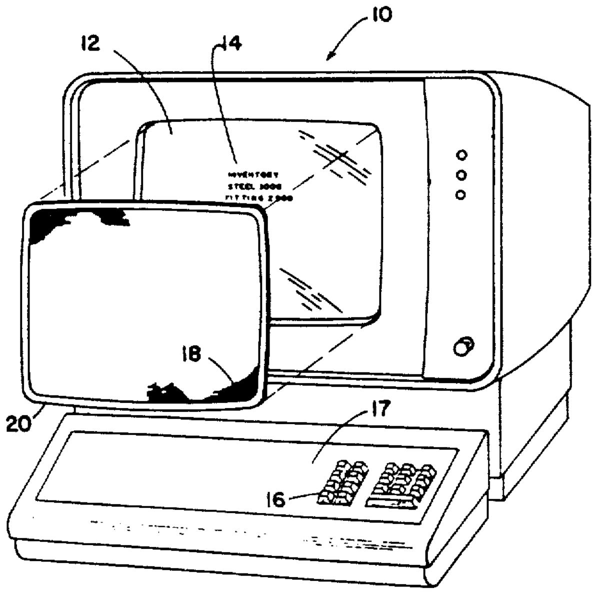

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 2 and 3 is confirmed.

* * * * *